Patented Dec. 22, 1942

2,306,061

UNITED STATES PATENT OFFICE 2,306,061

COFFEE

William Redmond Johnston, Bronx, N. Y., assignor to Standard Brands Incorporated, New York, N. Y., a corporation of Delaware No Drawing. Application February 14, 1940, Serial No. 318,836

7 Claims. (Cl. 99—71)

The invention relates to a method for the production of a soluble coffee, and to the product obtained thereby. More particularly, it pertains to the preparation of a coffee extract having augmented flavor, and includes correlated improvements and discoveries whereby the qualities of such an extract are enhanced.

An object of the invention is to provide a procedure for preparing a dry coffee extract containing aroma constituents which are of a highly volatile nature.

Another object of the invention is the provision of a method for the preparation of a soluble coffee aromatized with aroma constituents that are evolved at ordinary temperatures and pressures.

A further object of the invention is to produce an aromatized dry soluble coffee extract in a manner that may be readily, economically and effectively practiced whether for the production of large or of small quantities.

An additional object of the invention is to provide for the utilization of volatile compounds or vapors which are released when coffee is comminuted or ground.

A still further object of the invention is the yielding of a soluble coffee as a composition of matter containing highly volatile aroma constituents, and providing, when dissolved in water, a desirable and delectable beverage.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

The invention may be practiced by grinding coffee, which has been roasted, in a manner such that the compounds or vapors released through the grinding may be brought into contact with a soluble beverage substance, more particularly a coffee extract, at a relatively low temperature. Effectuation of the process may be accomplished by placing coffee in an enclosed grinder, passing an inactive gas which may be dry air or nitrogen through the grinder at atmospheric pressure, grinding whereby volatile compounds are released, and then absorbing released compounds by contacting with a soluble beverage substance, more particularly coffee extract, at a temperature substantially lower than ordinary room temperature, i. e., about 18° C. The soluble beverage substance, as a coffee extract utilized to absorb the volatile compounds, may be prepared in various manners, for example, by a cold or hot water extraction of a suitable cereal material, as a roasted wheat, rye, barley and the like, or of ground roasted coffee. Extracts thus obtained may be used either in a liquid condition with or without concentration, or after drying in the form of a dry soluble material.

By maintaining the coffee extract or soluble beverage material, especially in dry condition at a low temperature the released volatile compounds or aroma constituents are absorbed by contact with the coffee extract and yield therefrom an aromatized soluble coffee. A low temperature may be attained by surrounding a vessel containing the soluble coffee extract with a brine solution, or by solidified carbon dioxide or other suitable cooling means, whereby a temperature downwards from 0° C. is attained and may be more particularly from about −15° C. to about −70° C. A brine solution will be effective in lowering the temperature to about −15° C., whereas solidified carbon dioxide will yield a temperature of about −70° C.

It has been found desirable to pass the vapors through a drying zone prior to contact with the coffee extract, and this may be brought about by causing the vapors to contact with a suitable drying material, such as anhydrous calcium sulfate, sometimes referred to as "Drierite." A considerable amount of vapors are released during grinding of coffee, and hence it is not necessary that an inactive gas be passed through and over the coffee during its comminution or grinding. A convenient mode of operation when an inactive gas is employed is to introduce it into the chamber containing the coffee beans and from which they are fed to the grinding mechanism. Further, the ground coffee is collected in a suitable receiver which in turn is connected to an absorption means. Moreover, a continuation of the passage of the inert gas for a period following the grinding has led to desirable results, as has also a recirculation of gaseous mixture coming from the absorption phase.

Such a recirculation is effected by introducing the gaseous mixture again into the enclosed grinding space whereupon it passes through the coffee and into contact with the coffee extract whereby compounds which previously escaped absorption may at least in part be absorbed. The released vapors passing from the collecting vessel into which the ground coffee has been deposited may first be contacted with coffee extract in a vessel which is cooled with brine, i. e., which is at a temperature of about —15° C., and those vapors which are not absorbed therein are subsequently conducted into a vessel containing coffee extract cooled through the medium of solidified carbon dioxide which affords a temperature of about —70° C. In order to be cognizant of the rate at which the releasable compounds are being set free during the grinding of the coffee, and hence passing through the absorbent the gaseous mixture flowing from the zone cooled by means of solidified carbon dioxide may be led through a suitable flow meter.

As an illustrative embodiment of a manner in which the invention may be practiced, the following examples are presented:

Example I

A grinder which is adapted to be closed and which is in combination with a sealed receiver that in turn is connected with suitable means for drying the released vapors and for absorbing the same by contact with a coffee extract is provided with a quantity of freshly roasted coffee. The means for drying vapors passing from the receiver may be in the form of a tube filled with anhydrous calcium sulfate, and the coffee extract may be contained in tubes or cylinders, of which one is cooled by a brine solution and another or others by being surrounded with solid carbon dioxide. Twenty-seven pounds of freshly roasted coffee may be passed through the grinder in a period of about 35 minutes, and the vapors released during the grinding are contacted with the soluble coffee under the conditions above specified.

It has been found that the procedure is facilitated by the application of gentle suction, and this may be continued for a period after the grinding has been completed, such as for about 20 minutes. The absorption means was charged with about 300 grams of a dry soluble coffee extract, and a satisfactory aromatization thereof was effected through contact with and absorption of the vapors released during the grinding of the coffee. If desired, an inactive gas, for example, nitrogen, may be drawn through the coffee during the grinding and also through the ground coffee for an interval following the grinding.

Example II

A grinder adapted as set forth in Example I may be provided with about 20 lbs. of freshly roasted coffee beans and the absorption vessels filled to a desired extent with a soluble coffee extract which may be in an amount of about 300 grams. Before grinding the air is substantially removed by conducting nitrogen therethrough whereupon grinding of the coffee ensues with conductance of the vapors released into contact with the coffee extract which is maintained at relatively low temperatures, i. e., about —15° C., and about —70° C. When the coffee has been wholly ground, nitrogen is passed through the mass of coffee in order to take up released compounds and carry them into contact with the coffee extract. Thereby a satisfactory aromatization of the coffee extract was obtained, and in the event that a greater concentration of aroma constituents is desirable, such may be obtained by increasing the amount of coffee ground and/or by continuing the passage of inactive gas through the ground coffee for a longer period.

The foregoing procedure affords a simple and economical method for retention of volatile compounds released during the grinding of coffee, and it may be practiced in commercial coffee operations by simply sealing the grinders and attaching an absorption apparatus containing coffee extract to the coffee receivers. Moreover, the method is characterized by placing the freshly roasted coffee beans in a grinder provided with a hopper and a receiver which is attached to an absorption means. The arrangement is fully closed or sealed and an inactive gas, as nitrogen, conducted through the assembly until air is displaced. During this period the absorption vessels may be cooled by means of brine and solid carbon dioxide. When removal of air has been completed, the grinding may be started and the coffee beans fed at a substantially steady rate, as by a worm feed which revolves at about 135 R. P. M.

Grinding of the means leads to a release of volatile compounds which flow out from the ground coffee receiver into and through the absorption vessels, the absorption preferably being preceded by drying to remove moisture. During a grinding operation the evolution of volatile aroma constituents may amount to about 650 to 700 cc. per minute under the aforesaid conditions, and such flow corresponds to a grinding rate of approximately one-half pound per minute. Suitably the pressure in the system is just slightly above atmospheric, and release of aroma constituents is a function of the grind. A grind which has been found well adapted for the release of aroma constituents is one which will give a comminution such that approximately 25% of the ground coffee remains on a #30 sieve, whereas the rest passes through. The vapors released are absorbed through contact with a coffee extract which in an initial stage may be chilled with brine to a temperature of about —15° C. However, some of the volatile aroma constituents are not thereby absorbed, and hence in a subsequent stage the vapors are contacted with soluble coffee which is cooled by means of solid carbon dioxide to a temperature of about —70° C. The flow of released vapors, whereby contact with coffee extract is established, is preferably so regulated that not more than a small amount of the very volatile constituents remain unabsorbed. This may be effected by adjustment of the size of the vessel containing the coffee extract in conjunction with a control of the linear velocity of the released compounds or vapors.

Since certain changes in carrying out the above method, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statments of the scope of the invention which, as a matter of language, might be said to fall therebetween.

Having described my invention, what I claim as new and desire to secure by Letters Patent is:

1. A method for the production of a coffee composition which comprises grinding coffee and contacting compounds released thereby with a beverage substance at a temperature downward from about —15° C.

2. A method for the production of a coffee composition which comprises grinding coffee and contacting compounds released thereby with a coffee extract at a temperature from about −15° to about −70° C.

3. A method for the production of a coffee composition which comprises grinding coffee and contacting compounds released thereby with a coffee extract at atmospheric pressure at a temperature of about −15° C., and subsequently at a temperature of about −70° C.

4. A method for the production of a coffee composition which comprises placing coffee in a closed grinder, passing an inactive gas therethrough, grinding during passage of said gas, and absorbing compounds released thereby through contact with a coffee extract at atmospheric pressure and at a temperature downwards from −15° C.

5. A method for the production of a coffee composition which comprises placing coffee in a closed grinder, passing nitrogen therethrough, grinding during passage of said nitrogen, drying, absorbing compounds released thereby through contact with a coffee extract at atmospheric pressure and at a temperature of about −15° C., and subsequently at a temperature of about −70° C.

6. As a composition of matter a soluble beverage substance containing volatile compounds released during grinding of coffee and absorbed at a temperature downwards from about −15° C.

7. As a composition of matter a dry soluble coffee extract containing volatile compounds released during grinding of coffee and absorbed at a temperature from about −15° C. to about −70° C.

WILLIAM REDMOND JOHNSTON.